United States Patent
Li et al.

(10) Patent No.: US 7,715,839 B2
(45) Date of Patent: May 11, 2010

(54) METHOD OF CONTROLLING THE ROAMING OF TERMINAL USERS IN NGN NETWORK SYSTEM

(75) Inventors: Rujun Li, Shenzhen (CN); Guohua Ren, Shenzhen (CN); Chen Wang, Shenzhen (CN)

(73) Assignee: ZTE Corporation, Guangdong Province (CN)

( * ) Notice: Subject to any disclaimer, the term of this patent is extended or adjusted under 35 U.S.C. 154(b) by 530 days.

(21) Appl. No.: 11/720,438

(22) PCT Filed: Nov. 30, 2004

(86) PCT No.: PCT/CN2004/001377

§ 371 (c)(1),
(2), (4) Date: May 30, 2007

(87) PCT Pub. No.: WO2006/058455

PCT Pub. Date: Jun. 8, 2006

(65) Prior Publication Data

US 2008/0167034 A1   Jul. 10, 2008

(51) Int. Cl.
H04W 4/00   (2009.01)

(52) U.S. Cl. .............. 455/432.1; 455/404.2; 455/433; 455/435.1; 370/351

(58) Field of Classification Search .............. 455/404.2, 455/432.1, 433, 435.1; 370/351
See application file for complete search history.

(56) References Cited

U.S. PATENT DOCUMENTS

| | | | |
|---|---|---|---|
| 6,519,242 B1* | 2/2003 | Emery et al. | 370/338 |
| 2001/0049790 A1* | 12/2001 | Faccin et al. | 713/185 |
| 2002/0058506 A1* | 5/2002 | Amin et al. | 455/432 |
| 2005/0186960 A1* | 8/2005 | Jiang | 455/435.1 |

FOREIGN PATENT DOCUMENTS

| | | |
|---|---|---|
| CN | 1377547 | 10/2002 |
| CN | 1429047 | 7/2003 |
| CN | 1454440 | 11/2003 |

* cited by examiner

*Primary Examiner*—Lun-Yi Lao
*Assistant Examiner*—Dung Hong
(74) *Attorney, Agent, or Firm*—Connolly Bove Lodge & Hutz LLP

(57) ABSTRACT

The present invention relates to a method of controlling the roam of a terminal user in the NGN network system, including: dividing the network into regions in accordance with IP address field and defining the roam type and service attribute of each IP address field when the terminal user roams to each region; defining the roam right of the terminal user in a core control device according to the roam type; when the terminal registers with the core control device from a region, IP address of the terminal being uploaded to the core control device, and the core control device obtaining the roam type of the terminal in accordance with the IP address of the terminal; then judging whether the terminal user has such roam right of this roam type, if positive, the terminal registering successfully, otherwise failing; when the terminal registers successfully, the terminal user is able to use the network service and some service attributes in the region. By adopting the method of the present invention, it is possible that the core control device can control and manage the access of the terminal user to different regions.

16 Claims, 3 Drawing Sheets

METHOD OF CONTROLLING THE ROAMING OF TERMINAL USERS IN NGN NETWORK SYSTEM

RELATED APPLICATIONS

This application is a national stage application (under 35 U.S.C. 371) of PCT/CN2004/001377 filed Nov. 30, 2004.

TECHNICAL FIELD

The present invention belongs to the communication field, and particularly, relates to a method of controlling the roam of a mobile terminal in the next generation network (NGN) system structure.

BACKGROUND ART

Currently, the roam of a terminal user refers to that a mobile terminal user roams among different regions, and the roam of the mobile terminal user is seamless move, when the mobile terminal user moves, the network access point thereof can be changed at any time without interrupting the service session being conducted.

For the softswitch of the core control device in the next generation network structure, it is based on the packet switched data network, while the data network is not divided into distance and region, then the terminal user registers with the softswitch device worldwide. As for the softswitch, the processes to all terminal users are same. Currently, the softswitch does not conduct the processes in a different way according to the different access regions of the terminal user and the different network resources used.

SUMMARY OF THE INVENTION

The present invention aims to provide a method of controlling the roam of a terminal user in the NGN network, and solve the problem of dividing into roam regions in the NGN network structure, the roam problem of the terminal user accessing to different regions, and the problem of controlling the roam of the terminal user.

In order to realize the above objects, the present invention provides a method of controlling the roam of a terminal user in the NGN network system, and the NGN network system comprises a core control device based on the packet switched data network and mobile terminals; characterized in that the method comprises the following steps:

step 1, dividing into regions in accordance with IP address field;

step 2, setting the roam attribute of each IP address field when a terminal user roams to each region, and the roam attribute including the roam type and the service attribute;

step 3, setting the roam right of a terminal user in the core control device according to the roam type set in the core control device, each roam type corresponding to a roam right; meanwhile, these roam rights are able to be combined arbitrarily to form roam rights of different types;

step 4, when the terminal registers with the core control device from a region, IP address of the terminal being uploaded to the core control device, and if the IP address is not in the core control device, the registration failing; if the IP address is in the core control device, the core control device obtaining the roam type corresponding to the terminal in accordance with the IP address of the terminal; and step 5, further judging whether the terminal user has the roam right of this roam type, if it is positive, the terminal user registering successfully, otherwise failing; when the terminal user registers successfully, the terminal user is able to use the network service in the corresponding region.

In the above method of controlling the roam of a terminal user in the NGN network according to the present invention, the regions are divided in accordance with the IP address field, and the region has a broad conception and is not limited to an area, it can be composed of part of the IP address fields in an area, or of the IP address fields or part of the IP address fields in one or multiple areas. There can be one or multiple IP address fields in a region, but a certain IP address field only belongs to a certain region. This can be planned by the service providers according to the actual circumstances, and the planning can be different in different softswitch systems.

Further, according to the method of controlling the roam of a terminal user according to the present invention, the roam type can be defined flexibly for the softswitch system in a certain area, such as roaming in a local network, roaming outside the local network, roaming in a province, roaming in a country and roaming worldwide, and these can be customized according to the actual circumstances, and after these rules are defined, the softswitch system judges the roam type of the terminal user according to these rules, and a roam type correspond to a user, a same IP address field can be a roam type for a user, while to other users, it can be other roam types or local.

Further, the method of controlling the roam of a terminal user according to the present invention further comprises the management of the roam right of the terminal user of the soft switch system, the roam right of the terminal user should have different types correspondingly in accordance with the different roam types of the terminal user, namely, in the soft switch system, how many kinds of roam types there are, there will be roam rights of that number, and the roam right in the soft switch system is set in accordance with the user instead of the terminal, and different roam rights can be set for each user. When a user is in a region where the user has the roam right, a terminal with the user can access the softswitch system and use the network service, while in a roam region forbidden even the terminal can access the softswitch system, the user can not use the network service, Further, in the method of controlling the roam of a terminal user according to the present invention, a terminal mainly comprises a H.248 protocol terminal, a H.323 protocol terminal, a SIP protocol terminal and a MGCP protocol terminal. Each protocol terminal registers at the core control device of the network in the data network, wherein the registration information of the terminal with the IP address of the terminal is uploaded to the softswitch system, the softswitch, after completing the authentication of the terminal user, gets the roam type of the terminal user in accordance with the roam attribute set by the terminal user.

Further, in the method of controlling the roam of a terminal user, it further comprises the management of the service attribute and charging of the terminal user in a roam region. When a terminal user leaves its home region, if the region is configured with the roam service attribute, the terminal user uses the roam service attribute of this region when using the network service in this region, for example, calling the user of the roam region in the roam region belongs to a local roam call, while calling the user of home region in roam region belongs to a long distance roam call. As for the charging management of a roam terminal user, the core control device of the network writes these roam information of the terminal user into the CDR (Charging Detail Record) file according to whether the user is roaming, the roam type, and the network service type used, and a charging center conducts charging according to these information and corresponding charging policy.

Further, in the method of controlling the roam of a terminal user according to the present invention, if the terminal has multiple users, the roam right is to control each user at the terminal, when the terminal registers, if one of the users in the terminal has the corresponding roam right, then the terminal can conduct roam registration. After registering successfully, only the user with the roam right can make calls and perform other services, while for other users without the roam right, even the terminal registers successfully, these users can not make calls or perform other services.

Further, in the method of controlling the roam of a terminal user according to the present invention, if the terminal registers at the softswitch system through a border gateway such as the BGW, then for the softswitch system at this point, only the registration of the IP address of the border gateway can be seen, the softswitch can not distinguish the IP address of a certain terminal, therefore, the border gateway needs to do processes, such as uploading the actual registered IP address of the terminal to the softswitch system, thus the softswitch system can distinguish each terminal which registers with the softswitch system through the border gateway, then conducting roam management and control to the users of the terminal.

The present invention adopts the above method to manage and control the roam of a terminal user, and further restricts that the terminal user can access the core control device and uses the network service in some regions, while the terminal user can not access the core control device in other regions and then can not use the network service. Meanwhile when a terminal user accesses the core control device in different regions, there will be different rights, service attributes and different charging policies in accordance with different regions.

As the present invention adopts the method of dividing regions according to the IP address fields and defining the roam type in each region, it enables the network core control device to control and manage the access of each terminal user in different regions.

BRIEF DESCRIPTION OF THE ACCOMPANYING DRAWINGS

EMBODIMENTS FOR CARRYING OUT THE PRESENT INVENTION

Figure 1:
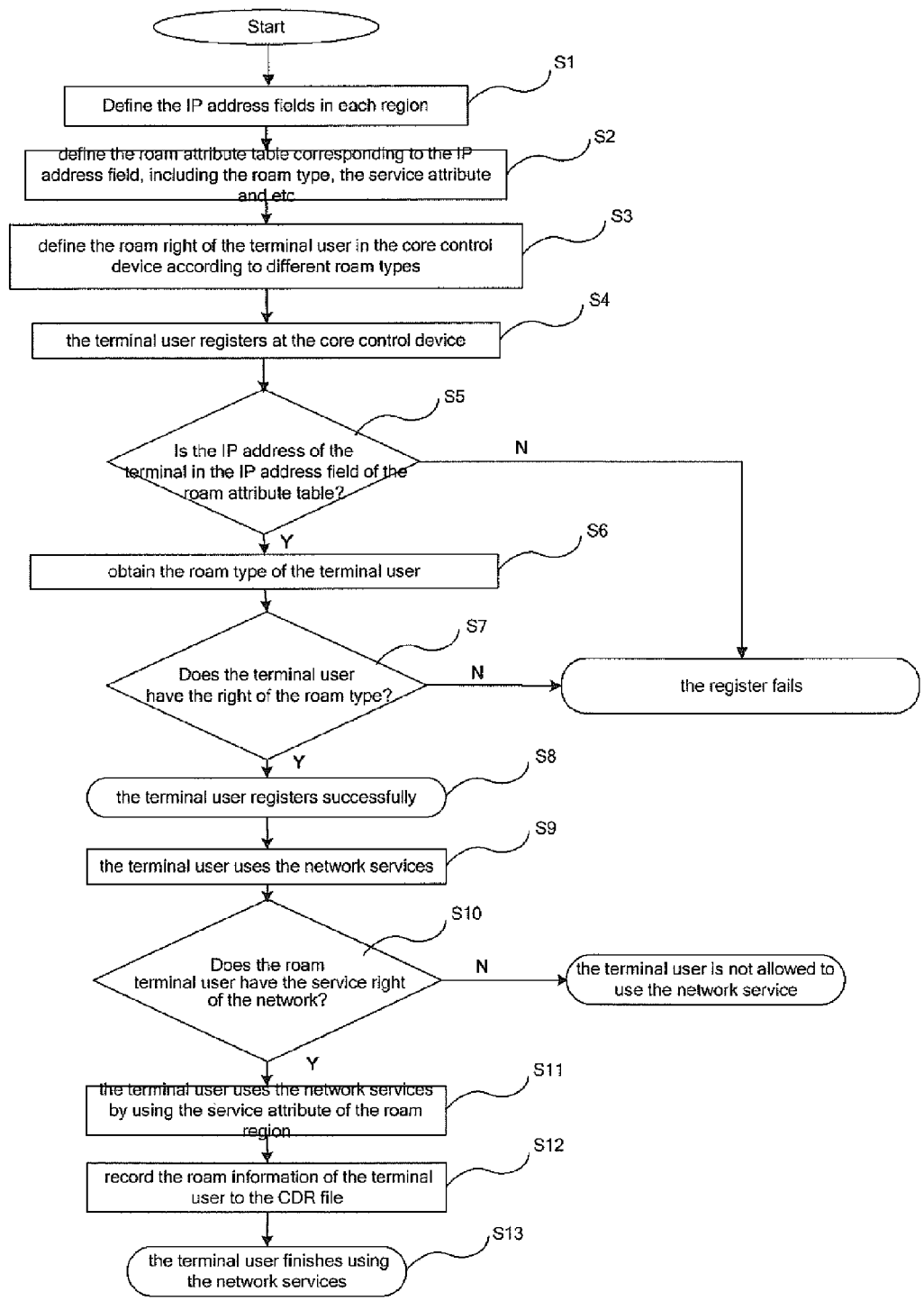
FIG. 1 is a flow view for realizing the present invention.

The following is a further detailed description of the present invention in conjunction with the accompanying drawings:

FIG. 1 shows the flow chart of the method of the present invention. As shown in FIG. 1, wherein:

in step S1, the regions are divided in accordance with the IP address field, the region has many meanings and is not limited to a certain area. The region can be composed of part of the IP address fields in an area or of the IP address fields or part of the IP address fields in one or more areas. There can be one or more IP address fields in a certain region, but a certain IP address field only belongs to a certain region. This can be planned by the service providers according to the actual circumstances, and the planning can be different in different core control devices.

In step S2, in the softswitch system, the roam attribute of each IP address field in each region to which a terminal user roams, the service attribute of the terminal user in each IP address field and etc. are defined. Wherein the said roam attribute includes the roam type. Here, the roam type can be defined flexibly, such as roaming in a local network, roaming outside a local network, roaming in a province, roaming in a country and roaming worldwide, which can be customized according to the actual circumstances. After the rules are defined, the softswitch system judges the roam type of the terminal user according to these rules. A roam type corresponds to a user, a same IP address field can be a roam type for a user, while for other users, it can be other roam types or the local.

In step S3, the roam right of a terminal user in the core control device is defined according to the definition of the roam type in the core control device, wherein each roam type corresponds to a roam right, meanwhile these roam rights can be combined arbitrarily to form roam rights of different types.

Thus, the management over the roam right of the terminal user of the soft switch system can be realized. The roam right of the terminal user should also have different types correspondingly in accordance with the different roam types of the terminal user, namely, in the soft switch system, the number of the roam types is equal to that of the roam rights, and the roam right in the soft switch system is set in accordance with the user, but not according to the terminal. Different roam rights can be set for each user. When a user is in a region in which the user has the roam right, a terminal with the user can access the softswitch system and use the network service, while in a region in which the user does not have roam right, even the terminal can access the soft switch system, the user can not use the network service. Therefore, controlling the roam right in the core control device is to control the roam right of each user.

In step S4, when a terminal registers with the core control device, the terminal uploads its IP address to the core control device.

In step S5, the core control device inquires whether the IP address included in.

In step S6, if the core control device includes the IP address uploaded by the terminal, the core control device obtains the roam type of the terminal, and if it does not include the IP address, the terminal fails to register.

In step S7, after obtaining the roam type of the terminal, the core control device judges whether the user of the terminal has the roam right of this roam type.

In step S8, if the user of the terminal has the roam right of this roam type, and then the terminal registers successfully, otherwise fails to register.

In step S9, after the terminal registers successfully, the terminal user is able to use the network service.

In step S10, if the terminal has multiple users, the control of the roam right is to control the roam right of each user at the terminal, when the terminal registers, if only one user in the terminal has the corresponding roam right, then the terminal can conduct roam registration. After registering successfully, whether each user has the right for using the network service is judged, and only the user with the roam right can make calls and perform other services, while for other users without the roam right, even the terminal registers successfully, these users can not make calls or perform other services.

In step S11, when a user uses the network service in a roam region, the user can use some of the service attributes of the roam region.

In step S12, the core control device records the roam information of users into the CDR file.

In step S13, the terminal user finishes using the network.

In the method of the present invention, the terminal mainly comprises a H.248 protocol terminal, a H.323 protocol terminal, a SIP protocol terminal and a MGCP protocol terminal, Each protocol terminal registers with the core control device in the data network, wherein the register information of the terminal will comprise that the IP address of the terminal is uploaded to the softswitch system. After completing the authentication of the terminal user, the softswitch gets the roam type of the terminal user in accordance with the roam attribute set by the terminal user.

In the method of the present invention, it further comprises the management over the service attribute and charging of the terminal user in a roam region. When a terminal user leaves its home region, if the region is configured with the roam service attribute, the terminal user uses the roam service attribute of this region when using the network service in this region. For example, calling a user of the roam region at a roam region belongs to a local roam call, while calling a user of the home region at a roam region belongs to a long distance roam call. As for the charging management of a roam terminal user, the core control device of the network writes whether the user is roaming, the roam type, and the network service type used into the CDR file according to these roam information of the terminal user, and a charging center conducts charging according to these information and corresponding charging policy.

In the method of the present invention, if the terminal registers with the softswitch system through a border gateway such as the BGW, then for the softswitch system at this point, the registration of the IP address of the border gateway can be seen, the softswitch system can not distinguish the IP address of a certain terminal. Therefore the border gateway needs to do processes, such as uploading the actual registered IP address of the terminal to the softswitch system, and the softswitch system can distinguish each terminal which registers with the softswitch system through the border gateway, then conducting roam management and control to the users of the terminal.

Figure 2:
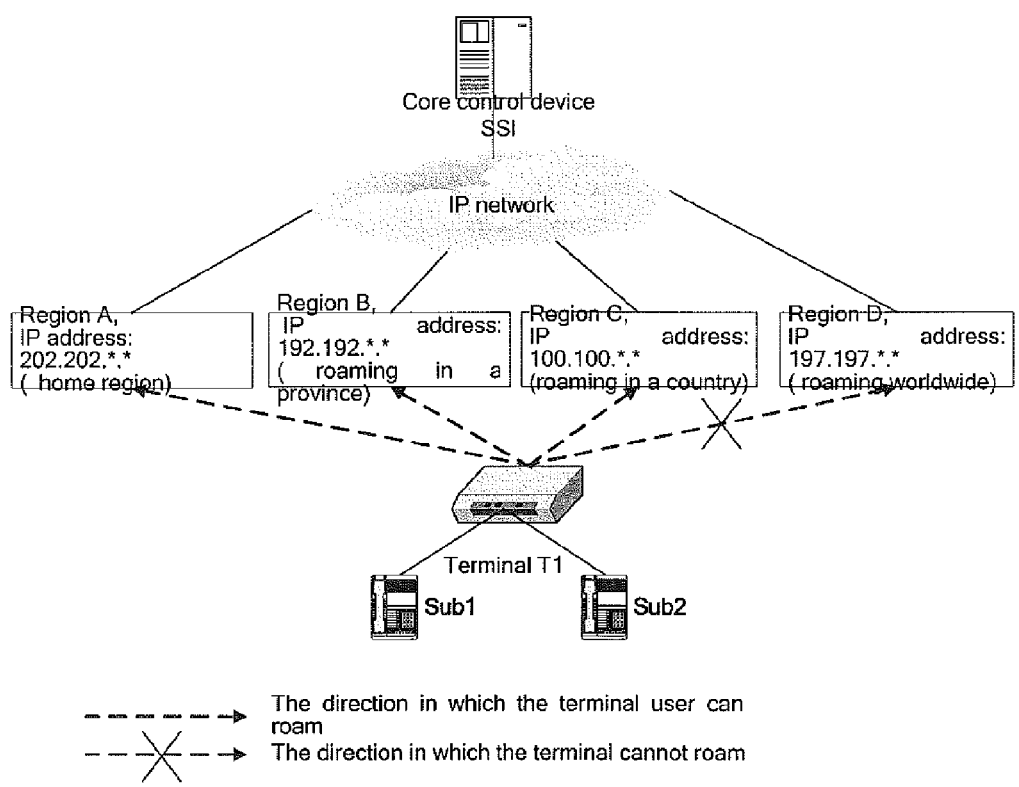
FIG. 2 is a structure view illustrating the system that a terminal directly accesses the core control device of the next generation network which provides the roam function.

FIG. 2 is a structure view illustrating that a terminal T1 according to the present invention at the IP network directly accesses the core control device of the next generation network which has the roam function. The terminal T1 has two users, and they are Sub1 and Sub 2 respectively. The terminal T1 is a user registering with the core control device SS1 in a region A. The region A is the home region of the terminal T1, and its IP address field is 202.202.*.*. A region B and a region C are the regions where the terminal T1 has roam right, and their IP address fields respectively are 192.192.*.* and 100.100.*.*, wherein the user Sub1 has the roam right in the region B, while the user Sub2 has the roam right in the region C; while in a region D, the terminal T1 does not have the roam right, and its IP address field is 197.197.*.*.

The configuration of the IP address region table at this point is shown in table 1:

TABLE 1

| network number | region number | IP address | sub-net mask | note |
| --- | --- | --- | --- | --- |
| 1 | 1 | 202.202.0.0 | 255.255.0.0 | region A |
| 1 | 2 | 192.192.0.0 | 255.255.0.0 | region B |

TABLE 1-continued

| network number | region number | IP address | sub-net mask | note |
| --- | --- | --- | --- | --- |
| 1 | 3 | 100.100.0.0 | 255.255.0.0 | region C |
| 1 | 4 | 197.197.0.0 | 255.255.0.0 | region D |

And the configuration of the roam attribute table at this point is shown in table 2:

TABLE 2

| attribute mode No. | IP address | sub-net mask | roam type |
| --- | --- | --- | --- |
| 1 | 202.202.0.0 | 255.255.0.0 | roaming in a local network |
| 1 | 192.192.0.0 | 255.255.0.0 | roaming in a province |
| 1 | 100.100.0.0 | 255.255.0.0 | roaming in a country |
| 1 | 197.197.0.0 | 255.255.0.0 | roaming worldwide |

Wherein, both the users Sub1 and Sub2 are configured with and use the mode number 1 in the roam attribute table, and the roam right of the Sub1 user is configured as: roaming in a local network+roaming in a province, while the roam right of the Sub2 user is configured as: roaming in a local network+ roaming in a country.

The registration of the terminal T1 at a core control device SS1 in a home region A and the call process of the users Sub1 and Sub2, the process that the terminal T1 roams from the home region A to the regions B and C and registers with the core control device SS1 and the call process of the users Sub1 and Sub2, and the call process that the terminal T1 roams from the home region A to the region D and registers with the core control device SS1 and the call process of the users Sub1 and Sub2 are described respectively as follows.

(1) The registration process that the terminal T1 registers with the core control device SS1 in the home region A and the call process of the users Sub1 and Sub2 of the terminal T1

When the terminal T1 registers with the core control device SS1 in the region A through the IP network, the terminal T1 uploads its IP address 202.202.*.* to the core control device SS1, the core control device SS1 inquires table 1 and obtains that the IP address falls into the IP address field of the region A, and inquires table 2 according to the roam attribute mode numbers designated for the two users Sub1 and Sub2 of the terminal T1 and the IP address and judges that the users Sub1 and Sub2 are roaming in a local network, and the registration process of the terminal T1 is the same as that of a common terminal at this point. After the terminal T1 registers successfully, the roam states of the users Sub1 and Sub2 of the terminal T1 are roaming in a local network, and the call processes of the two users are the same as that of a common user.

(2) The registration process that the terminal T1 roams from the home region A to regions B and C and registers with the core control device SS1, and the call process of the users Sub1 and Sub2 of the terminal T1.

When the terminal T1 roams from the region A to regions B and C and registers with the core control device SS1 through the IP network, as the regions B and C are not the home region of the terminal T1, the registration process of the terminal T1 belongs to roam registration at this point, and the registration process is that the terminal T1 reports its IP address, which is 192.192.*.* in the region B and is 100.100.*.* in the region C, and other relevant information to the core control device SS1. When the core control device SS1 receives these information, it firstly inquires table 1 according to the IP address and obtains that the two IP address fields are not the local IP address of the terminal T1, and further inquires table 2 according to the roam mode numbers configured for the users Sub1 and Sub2 of the terminal T1 and the IP address and obtains the roam type of the terminal T1, and then inquires the roam right of the terminal T1. As the terminal T1 has the roam rights of the regions B and C, it has passed the right judgment when it registered, then the terminal T1 registers successfully. The core control device SS1 modifies the state of the terminal T1 as the corresponding roam state and the IP address registered. When the terminal T1 registers successfully in the region B, the user Sub1 has the roam right in the region B, it can use network services such as making calls, and the user Sub1 uses the network services by using the service attribute of the region B. While the user Sub2 does not have the roam right of the region B, then the user Sub2 can not use the network service in the region B. When the terminal T1 registers successfully in the region C, the user Sub2 has the roam right in the region C, then it can use network services such as making calls, and the user Sub2 uses the network services by using the service attribute of the region C. While the user Sub1 does not have the roam right of the region C, therefore it can not use the network service in the region C.

(3) The registration process that the terminal T1 roams form the home region A to the region D and registers at the core control device SS1, and the call process of the users Sub1 and Sub2 of the terminal T1

When the terminal T1 roams from the region A to the region D and registers at the core control device SS1 through the IP network, as the region D is not the home region of the terminal, then the registration of the terminal T1 belongs to roam registration at this point, and the registration process at this point is that the terminal T1 reports its IP address which is 192.192.*.* and other relevant information to the core control device SS1. When the core control device SS1 receives these information, it firstly inquires table 1 according to the IP address field and obtains that the IP address field is not a local IP address, and then inquires table 2 according to the IP addresses and roam attribute mode number of the user to obtain the roam type of the terminal user, and then inquires the roam right of the users Sub1 and Sub2 of the terminal T1. As no user in the terminal T1 has the roam right in the region D, therefore the core control device SS1 returns no roam right to the terminal T1, and refuses the registration of the terminal in the region D. Because the terminal T1 fails to register, the users Sub1 and Sub2 on the terminal T1 can not make calls or perform other services.

Figure 3:
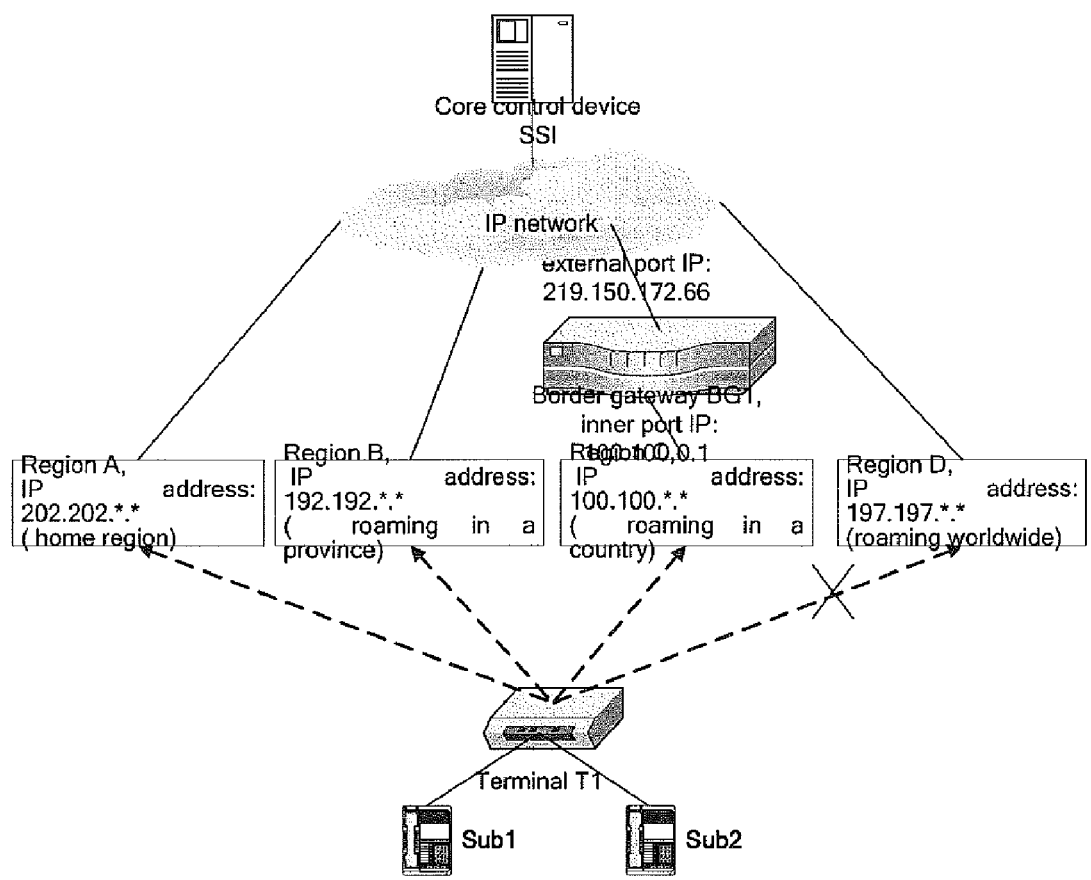
FIG. 3 is a structure view illustrating the system that a terminal accesses the core control device of the next generation network which provides the roam function through a border gateway.

As for FIG. 3, when the terminal T1 is in the region C, it registers at the core control device SS1 through a border gateway BG1, and at this point, the terminal IP addresses received by the core control device SS1 of the network are the IP address 219.150.172.66 of the border gateway BG1 and the actual IP address 100.100.*.* of the terminal T1. The core control device of network judges the registration region of the terminal according to the actual IP address of the terminal T1, and further obtains the roam type of the terminal. Because the terminal T1 has the roam right in the region C, the terminal T1 registers successfully. When the terminal T1 registers successfully at the region C, the user Sub2 has the roam right in the region C, and it can use network services such as making calls, and the user Sub2 uses the network services by using the service attribute of the region C. While the user Sub1 does not have the roam right in the region C, then the user Sub1 can not use the network services in the region C.

Of course, various embodiments can be provided in the present invention. It will be understood by those of ordinary skill in the art that various changes and modifications may be made therein without departing from the spirit and scope of the present invention, and these changes and medications fails in the scope of the invention as defined by the following claims.

INDUSTRIAL APPLICABILITY

The present invention can be applied to the structure of the NGN network system, for realizing the management and control over the roam of a terminal in the NGN network. The present invention adopts the method of dividing regions according to the IP address field and defines the roam type in each region, enabling the core control device of the network to conduct control and management over the access of a terminal user in different regions.

What is claimed is:

1. A method of controlling the roam of a terminal user in a NGN network system, and the NGN network system comprises a core control device based on a packet switched data network and mobile terminals, characterized in that the method comprises the following steps:
   step 1, dividing regions in accordance with IP address field;
   step 2, setting the roam attribute of each IP address field in each of the regions to which a terminal user roams, and the roam attribute including a roam type and a service attribute;
   step 3, setting the roam right of a terminal user in the core control device according to the roam type set in the core control device such that each roam type corresponds to a roam right;
   step 4, when the terminal registers with the core control device from a region, the IP address of the terminal being uploaded to the core control device, and if the IP address does not exist in the core control device, the registration failing; if the IP address is in the core control device, the core control device obtaining the roam type corresponding to the terminal in accordance with the IP address of the terminal; and
   step 5, further judging whether the terminal user has the roam right of this roam type, if positive, the terminal user registering successfully, otherwise failing; and when the terminal user registers successfully, the terminal user is able to use the network service in the corresponding region.

2. The method of controlling the roam of a terminal user in a NGN network system according to claim 1, characterized in that after the terminal user registers successfully, when one terminal has multiple users, only the user having corresponding roam right can use network services.

3. The method of controlling the roam of a terminal user in a NGN network system according to claim 2, characterized in that the terminal registers with the core control device through a border gateway, and the border gateway reports the actual registered IP address of the terminal to the core control device such that the core control device can identify the IP address of the terminal.

4. The method of controlling the roam of a terminal user in a NGN network system according to claim 2 characterized in that the terminal comprises a H.248 protocol terminal, a H.323 protocol terminal, a SIP protocol terminal and a MGCP protocol terminal, when the terminal registers with the core control device, the registration information of the terminal will comprise that the IP address of the terminal is uploaded to the core control device, and the core control device, after completing the authentication of the terminal user, gets the roam type of the terminal user in accordance with the roam attribute set by the terminal user.

5. The method of controlling the roam of a terminal user in a NGN network system according to claim 1, characterized in that when the terminal user uses the network services at the roam region, the terminal user can use the service attribute of the roam region; and the core control device of the network records the roam information of the user into a Charging Detail Record file.

6. The method of controlling the roam of a terminal user in a NGN network system according to claim 5, characterized in further comprising a step of controlling the charging of the terminal user when it is in the roam region.

7. The method of controlling the roam of a terminal user in a NGN network system according to claim 5 characterized in that the terminal comprises a H.248 protocol terminal, a H.323 protocol terminal, a SIP protocol terminal and a MGCP protocol terminal, when the terminal registers with the core control device, the registration information of the terminal will comprise that the IP address of the terminal is uploaded to the core control device, and the core control device, after completing the authentication of the terminal user, gets the roam type of the terminal user in accordance with the roam attribute set by the terminal user.

8. The method of controlling the roam of a terminal user in a NGN network system according to claim 1, characterized in that in the step 1, the region can be composed of the IP address fields of one or more areas, or of part of the IP address fields, and there can be one or more IP address fields in a region, but a certain IP address field only belongs to a certain region.

9. The method of controlling the roam of a terminal user in a NGN network system according to claim 8 characterized in that the terminal comprises a H.248 protocol terminal, a H.323 protocol terminal, a SIP protocol terminal and a MGCP protocol terminal, when the terminal registers with the core control device, the registration information of the terminal will comprise that the IP address of the terminal is uploaded to the core control device, and the core control device, after completing the authentication of the terminal user, gets the roam type of the terminal user in accordance with The roam attribute set by the terminal user.

10. The method of controlling the roam of a terminal user in a NGN network system according to claim 1, characterized in that in the step 2, the roam type further comprises roaming in a local network, roaming outside a local network, roaming in a province, roaming in a country and roaming worldwide.

11. The method of controlling the roam of a terminal user in a NGN network system according to claim 10 characterized in that the terminal comprises a H.248 protocol terminal, a H.323 protocol terminal, a SIP protocol terminal and a MGCP protocol terminal, when the terminal registers with the core control device, the registration information of the terminal will comprise that the IP address of the terminal is uploaded to the core control device, and the core control device, after completing The authentication of the terminal user, gets the roam type of the terminal user in accordance with the roam attribute set by the terminal user.

12. The method of controlling the roam of a terminal user in a NGN network system according to claim 1, characterized in that the roam rights can be combined arbitrarily to form different types of roam rights.

13. The method of controlling the roam of a terminal user in a NGN network system according to claim 12 characterized in that the terminal comprises a H.248 protocol terminal, a H.323 protocol terminal, a SIP protocol terminal and a MGCP protocol terminal, when the terminal registers with the core control device, the registration information of the terminal will comprise that the IP address of the terminal is uploaded to the core control device, and the core control device, after completing the authentication of the terminal user, gets the roam type of the terminal user in accordance with the roam attribute set by the terminal user.

14. The method of controlling the roam of a terminal user in a NGN network system according to claim 1 characterized in that the terminal comprises a H.248 protocol terminal, a H.323 protocol terminal, a SIP protocol terminal and a MGCP protocol terminal, when the terminal registers with the core control device, the registration information of the terminal will comprise that the IP address of the terminal is uploaded to the core control device, and the core control device, after completing the authentication of the terminal user, gets the roam type of the terminal user in accordance with the roam attribute set by the terminal user.

15. The method of controlling the roam of a terminal user in a NGN network system according to claim 1, characterized in that the terminal has multiple users, the control of the roam right is to control the roam right of each user at the terminal; when the terminal registers, as long as one user in the terminal has the corresponding roam right, then the terminal can conduct roam registration, and after the registering successfully, only the user with the roam right can make calls and use other services.

16. The method of controlling the roam of a terminal user in a NGN network system according to claim 1, characterized in that the terminal registers with the core control device through a border gateway, and the border gateway reports the actual registered IP address of the terminal to the core control device such that the core control device can identify the IP address of the terminal.

* * * * *